April 10, 1956  H. E. METCALF ET AL  2,741,593
FLUID COOLED NEUTRONIC REACTOR
Filed Nov. 6, 1945  2 Sheets-Sheet 1

Concentration of Fissionable Isotope to Maintain Same K Factor
(Atoms Isotope/Molecule $H_2O$)

Witnesses:
Estill E. Ezell
Walter L. Schlegel, Jr.

Inventors:
Herbert E. Metcalf
Henry W. Johnson
Raymond S. Chisholm
By: Robert A. Cavender
Attorney April 10, 1956 H. E. METCALF ET AL 2,741,593
FLUID COOLED NEUTRONIC REACTOR
Filed Nov. 6, 1945 2 Sheets-Sheet 2

Witnesses:
Estill E. Ezell
Walter L. Schlegel, Jr.

Inventors:
Herbert E. Metcalf
Henry W. Johnson
Raymond S. Chisholm
By Robert A. Lowndes
Attorney … …

United States Patent Office 2,741,593
Patented Apr. 10, 1956

2,741,593

FLUID COOLED NEUTRONIC REACTOR

Herbert E. Metcalf, Henry W. Johnson, and Raymond S. Chisholm, Chicago, Ill., assignors to the United States of America as represented by the United States Atomic Energy Comission Application November 6, 1945, Serial No. 627,073

2 Claims. (Cl. 204—193)

This invention relates to neutronic reactors and more particularly to a novel method and means for increasing the neutron reproduction factor of a fluid cooled reactor.

In neutronic reactors a neutron fissionable isotope such as $U^{233}$, $U^{235}$, or $94^{239}$ or mixtures thereof is subjected to fission by absorption of neutrons, and a self-sustaining chain reaction is established by the neutrons evolved by the fission. In general, such reactors comprise bodies or compositions containing such fissionable material, for example, natural uranium, disposed in a neutron slowing material which slows the neutrons to thermal energies. Such a slowing material is termed a neutron moderator. Carbon and $D_2O$ (heavy water) are typical moderators suitable for such use. Heat is evolved during the reaction which is removed by passage of a coolant through the reactor or in heat exchange relationship therewith. Specific details of the theory and essential characteristics of such reactors are set forth in U. S. Patent 2,708,656 of Enrico Fermi and Leo Szilard, Serial No. 568,904, filed December 19, 1944.

The ratio of the fast neutrons produced in one generation by the fissions to the original number of fast neutrons in a theoretical system of infinite size where there can be no external loss of neutrons is called the reproduction or multiplication factor or constant of the system, and is denoted by the symbol K. For any finite system, some neutrons will escape from the periphery of the system. Consequently a system of finite size may be said to have a K constant, even though the value thereof would only exist if the system as built were extended to infinity without change of geometry or materials. Thus when K is referred to herein as a constant of a system of practical size, it always refers to what would exist in the same type of system of infinite size. If K can be made sufficiently greater than unity to indicate a net gain in neutrons in the theoretical system of infinite size, and then an actual system is built to be sufficiently large so that this gain is not entirely lost by leakage from the exterior surface of the system, then a self-sustaining chain reacting system of finite and practical size can be built to produce power and related by-products by nuclear fission of natural uranium. The neutron reproduction ratio in a system of finite size, therefore, differs from K by the external leakage factor, and by a factor due to the neutron absorption by localized neutron absorbers, and the reproduction ratio must still be sufficiently greater than unity to permit the neutron density to rise exponentially with time in the system as built.

During the interchange of neutrons in a system of finite size, comprising bodies of any size disposed in a neutron moderator, neutrons may be lost to the chain reaction in four ways:

1. by absorption or capture in the uranium content of the bodies without producing fission;
2. by absorption or capture in the moderator material itself;
3. by absorption or capture by the impurities present in both the uranium bodies and the moderator; and
4. by leakage out of the system through the periphery thereof.

It will be understood that the power value at which a neutronic reactor can be operated is limited in at least one respect by the efficiency of the cooling means associated therewith. Also, the amount of coolant which can be introduced into a reactor is limited by the neutron absorption in the coolant. Consequently, the best designs for a water cooled reactor thus far developed have been able to include annular coolant channels of a thickness of only about 1½ mm. to avoid too great a reduction in K factor. This limitation of the amount of coolant passing through the reactor limits the rate of heat removal from the reactor, thus imposing a serious limitation upon the power at which the reactor can be operated and also creating serious difficulties upon the occurrence of the swelling of the "slugs" of uranium or other fissionable material which has been frequently found to occur.

Thus, it is an object of the invention to increase the amount of coolant which may be passed through the reactor and to tolerate the above-mentioned swelling of the uranium slugs by increasing the size of the coolant channels.

The present invention comprehends the use of a quantity of fissionable material in a neutron absorbing coolant sufficient to form a solution or suspension having a K factor above zero. In such a case neutrons are evolved in the coolant and are supplied to the chain reaction to at least partially compensate for the neutrons absorbed by the coolant. The extra neutrons thus produced effectively diminish neutron losses to the chain reaction resulting from the before-mentioned absorption in the coolant, and permit use of a larger amount of coolant in the reactor.

Hence, another object of the invention is to provide a novel method and means for increasing the neutron reproduction factor of a fluid cooled neutronic reactor by associating with the fluid coolant a substance adapted to be carried thereby and capable of producing neutrons by nuclear reaction under neutron bombardment.

As discussed above, a fluid coolant such as water passing through the reactor absorbs some of the neutrons available therein for sustaining a chain fission reaction, thereby decreasing the reproduction constant or K value of the reactor. Thus, the critical size at which the reactive composition is capable of sustaining a chain reaction is increased by the use of a neutron absorbent coolant, and a further object of the invention is to decrease the critical size of such a reactor by adding fissionable material to the coolant. By thus decreasing the critical size of the reactor, a more compact structure is provided.

A more specific object of the invention is to increase the reproduction factor of a water cooled reactor by dissolving or suspending fissionable material in the water coolant.

Other objects and advantages of the invention will become apparent by reference to the accompanying drawings and the ensuing disclosure.

In this specification and claims the name of the element is used to designate the element generically either in its elemental or combined state unless otherwise indicated by the context.

Figure 1:
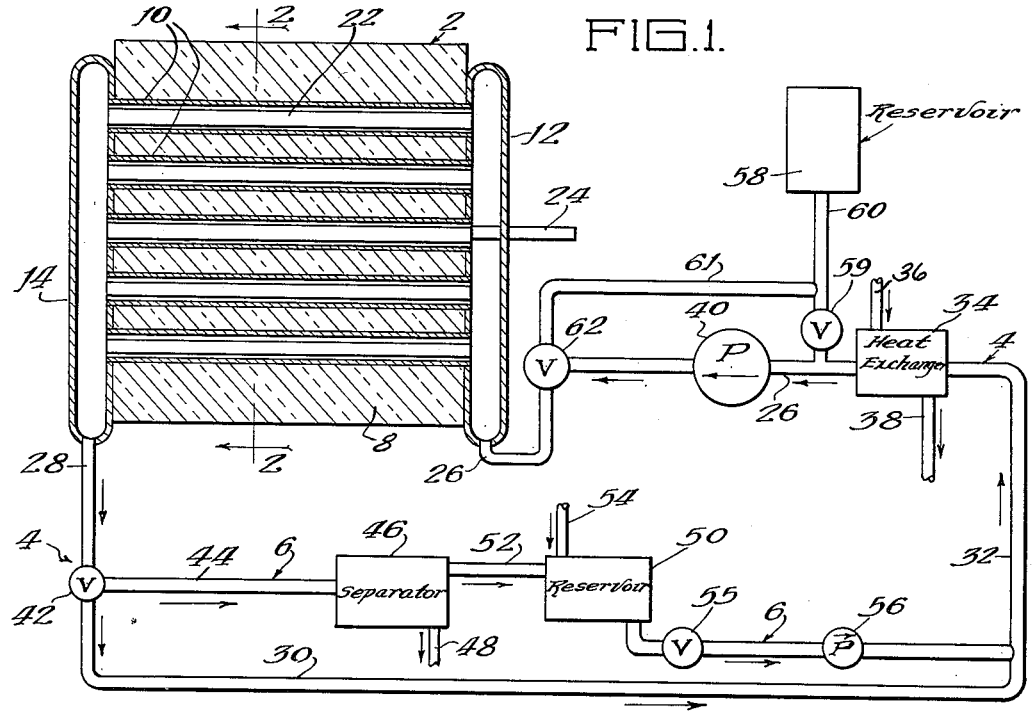
Fig. 1 is a flow diagram of a coolant system associated with a neutronic reactor, said reactor being shown in section along a vertical plane substantially bisecting the reactor longitudinally thereof.

Describing a device in detail utilizing the present invention, the system comprises a neutronic reactor generally designated 2, a fluid circulating system generally designated 4 associated with said reactor, and a by-pass circuit generally designated 6.

The reactor 2 is herein illustrated as comprising a matrix 8 of neutron moderator, such as graphite or heavy water, with tubes 10 extending therethrough, said tubes being connected at oposite ends thereof to inlet and outlet headers 12 and 14, respectively.

Figure 3:
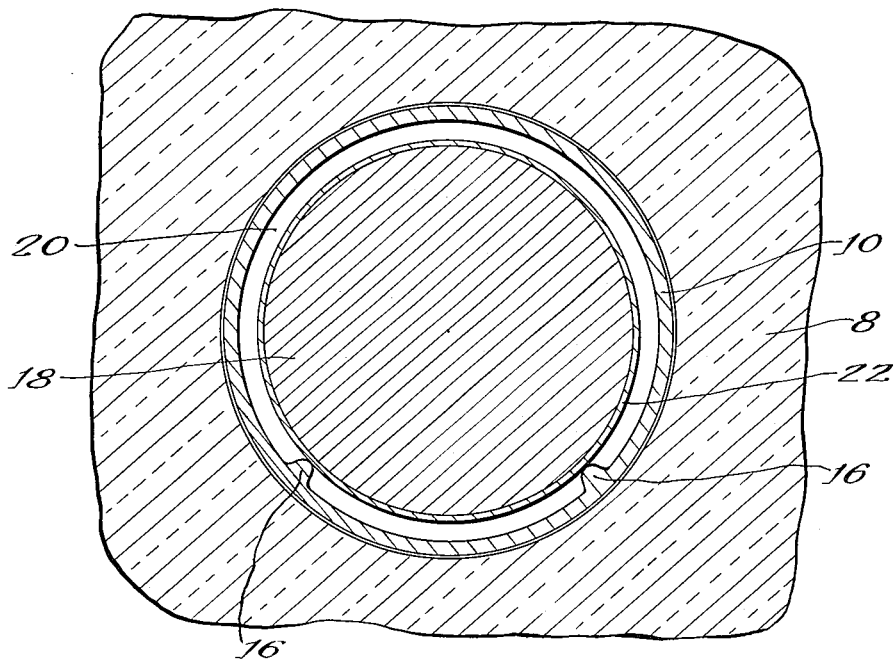
Fig. 3 is an enlarged transverse sectional view taken through one of the reactor tubes and associated uranium rod shown in Figs. 1 and 2.
Figure 2:
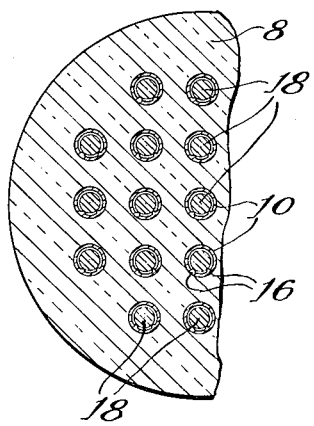
Fig. 2 is a sectional view of a fragment of the illustrated reactor taken in the transverse vertical plane indicated by the line 2—2 of Fig. 1.

Each tube 10, as clearly seen in Fig. 3, comprises ribs or lugs 16 on the inner perimeter thereof for positioning centrally thereof a uranium rod 18, thus providing a substantially annular fluid passage 20 around said rod. The rod 18 is preferably completely enclosed within a jacket 22 in thermal contact therewith, said jacket being formed of any desired neutron-permeable, fluid-tight substance having a relatively low neutron capture cross section, such as, for example, aluminum or beryllium.

It may be noted that only a few of the tubes 10 and associated rods 18 are illustrated herein for the purpose of clarity; and it will be understood that in actual practice an operative reactor of this type may be constructed in accordance with the disclosure of the above-mentioned co-pending application.

The nuclear fission chain reaction within the reactor 2 is preferably regulated by one or more control rods 24, each of said rods being movable lengthwise thereof through a complementary slot in the reactor 2 to regulate the reaction therein by regulating neutron losses thereof as is more fully described in said Fermi et al. U. S. Patent 2,708,656.

The circulating system 4 comprises inlet and outlet pipes 26 and 28 respectively, connected to respective headers 12 and 14. The outlet pipe 28 is connected to a pipe 30 which is in turn connected to a pipe 32 provided with a conventional heat exchanger device 34 through which a coolant fluid is passed by means of inlet and outlet pipes 36 and 38 respectively, said fluid passing through the device 34 in heat exchange relationship with the fluid flowing through the pipe 32. The heat exchanger 34 is connected to the inlet pipe 26 at the suction side of a pump 40 associated therewith.

Thus, during operation of the neutronic reactor 2 a coolant fluid is circulated through the tubes 10 by means of the above-mentioned system, said fluid comprising fissionable material which fissions under bombardment by neutrons within the reactor 2 to produce additional neutrons, thereby increasing the neutron reproduction factor of the reactor 2 because at least part of the neutrons normally absorbed by the coolant are compensated for.

The coolant fluid used as herein contemplated may comprise a true solution or other suspension of the fissionable isotope in the cooling fluid. This isotope may be dissolved, for example, as uranyl or plutonyl fluoride, sulphate, nitrate, carbonate, or other soluble uranium or plutonium compound, or may be suspended as $UO_2$ or similar compositions.

The coolant may be withdrawn or bled from the system 4 by means of the above-mentioned by-pass circuit 6, which includes a conventional 3-way operating valve 42 in the pipe 28, said valve being connected to a pipe 44 which is in turn connected to a conventional separator device 46 comprising conventional means (not shown) for separating the uranium-containing material from the carrier fluid. The uranium-containing material is conveyed from the separator 46 by an outlet pipe 48 to accommodate treatment of said material to recover fission products resulting from the neutron bombardment thereof.

The coolant carrier fluid is conveyed from the separator device 46 to a reservoir 50 through a pipe 52, said reservoir having an inlet 54 through which additional uranium-containing material in suitable form may be introduced into the system. The reservoir 50 is connected through a conventional shut-off valve 55 to the suction side of a pump 56 which discharges into the before-mentioned pipe 32 of the system 4.

As the result of withdrawing the coolant fluid from the system 4 by means of the circuit 6, the amount of coolant in the system is diminished, and a make-up coolant tank or reservoir 58 is provided for supplying additional coolant to the system 4 to make up the losses therefrom as the result of bleeding off said coolant through the by-pass circuit 6.

The tank 58 is connected to a pipe 60 which is in turn connected to the inlet pipe 26 at the suction side of pump 40, through a conventional operating valve 59, which is adjustable to control the amount of fluid introduced into the system 4 from the tank 58. The pipe 60 comprises a branch pipe 61 connected to the pipe 26 at the discharge side of the pump 40 through a conventional 3-way operating valve 62. Thus, by regulating the valves 59 and 62, coolant may be pumped into the pipe 26 from the tank 58 or into said tank from the pipe 26. By means of this arrangement, the coolant may, if desired, be quickly withdrawn from the system 4 and conveyed to the tank 58 for storage therein upon termination of the neutronic reaction within the reactor 2.

It will be understood that, if desired, the valve 55 may be closed, and all of the coolant passing through the separator 46 may thus be cut off from the system 4, fresh coolant being supplied from the tank 58 through the valve 59.

Figure 4:
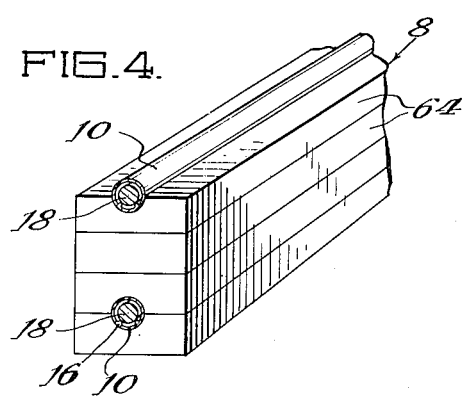
Fig. 4 is a fragmentary perspective view illustrating the actual construction of the reactor which is diagrammatically shown in Figs. 1 and 2.

In actual practice, a graphite moderated reactor is built up by piling graphite blocks 64 in the manner illustrated in Fig. 4, with the tubes 10 disposed in complementary grooves within the associated blocks. This construction has given rise to the term "pile" which is frequently applied to a neutronic reactor whether it comprises a solid or a fluid neutron moderator. The generic term "reactor," however, is preferable and is used in this specification and claims, inasmuch as the invention is applicable to any suitable form of neutronic reactor capable of sustaining a nuclear fission chain reaction.

The entire system is preferably enclosed within a biological shield (not shown) of any suitable material, such as ordinary water or concrete capable of absorbing radioactive emanations from the reactor and from the fission products within the coolant, thereby affording protection for operating personnel.

Preferably the fissionable composition to be dissolved or dispersed in the coolant should contain more fissionable isotope than is present in natural uranium, i. e., the fissionable isotope concentration preferably should be above 0.7 percent by weight and usually at least one percent by weight of the composition dissolved or dispersed. Moreover, the composition should not have an excessive danger sum (usually below 0.3) and, therefore, should be substantially free from high neutron absorbers such as cadmium or boron having a danger coefficient above 100 and at all events sufficient fissionable isotope should be present to give the solution or dispersion a K factor above zero.

The exact amount of the fissionable isotope in the coolant will depend to a large degree on the amount of coolant in the reactor and the average K factor of the reactor. One way to establish a suitable concentration includes the steps of filling the coolant channels with coolant free from fissionable isotope and then gradually adding fissionable isotope to the coolant and increasing the concentration until the desired K factor of the reactor becomes sufficiently high to permit maintenance of a chain reaction.

It is found advantageous to avoid a concentration wherein the K factor of the cooling solution is too high. While the solution or suspension may be capable of sustaining a chain reaction it rarely should have a K factor above 1.1. Moreover, it has been found that coolants may be more easily handled with less danger of explosive reaction where the K factor of the coolant is below one.

Figure 5:
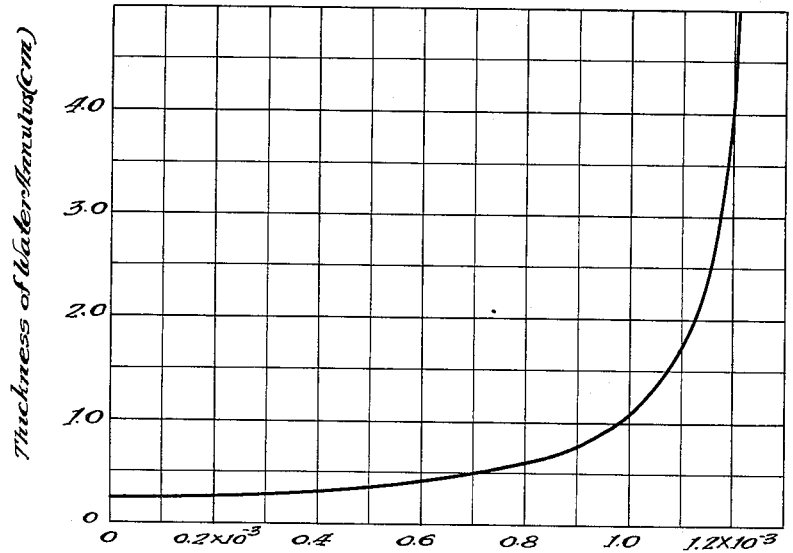
Fig. 5 is a graph showing the relationship between the amount of fissionable isotope in the coolant, and the thickness of the coolant annulus.

The effect of the fissionable isotope in the coolant is clearly shown in Fig. 5, where the concentration of fissionable isotope in water is plotted against thickness of coolant annulus, and the curve designates the concentration of isotope required to compensate for an increase in annulus in order to maintain the same K factor. This curve is approximately accurate where the thickness of the annulus is of the order of about one tenth of the diameter thereof. For example, if a reactor has a coolant annulus of about 2.2 millimeters and a diameter of about 2 centimeters it will have a given K factor. By enriching the coolant as indicated in the curve a corresponding increase in annulus thickness is permissible, without changing the K factor. It will be noted that the curve of Fig. 5 is asymptotic, and that at over about 1.2 atoms of fissionable material per 1000 molecules of water, water annulus can be infinitely thick. That is, of course, the extreme condition and usually such a concentration is avoided since otherwise the solution may become chain reacting itself and therefore more difficult to handle. However, water annuli up to at least 1 cm. are desirable in high powered reactors and such annuli can be tolerated in the reactor without reducing the K factor, with slightly less than about 1 atom of fissionable isotope per 1000 water molecules. However, even with 0.02 atoms of fissionable isotope per 1000 molecules of water, some increase in the water anulus is made available to dissipate power. All of the dispersions of a fissionable material in water shown in Fig. 5 have K factors greater than zero and less than unity, although higher concentrations will raise the K factor above unity and such higher concentrations may be resorted to if proper precautions are taken to prevent establishment of a chain reaction in the coolant while it is out of the reactor.

While the application has been primarily described with particular reference to the introduction of enriched compositions into the coolant, uranium compounds containing $U^{235}$ in natural concentration may also be used so long as the K factor of the solution is above zero. However less effect occurs when natural uranium compositions are used.

While the theory of nuclear reactions set forth herein is based on the best presently known experimental evidence, the invention is not limited thereto, as additional experimental data later discovered may modify the theory disclosed.

Obviously, many modifications may be made in the specific embodiments disclosed without departing from the intended scope of the invention.

What is claimed is:

1. In a neutronic reactor comprising a matrix of neutron moderator with tubes extending therethrough and rods of uranium disposed centrally of the tubes to form coolant annuli, means for circulating coolant water through the annuli, the improvement wherein the coolant water has dispersed therein a fissionable isotope in a concentration or from 0.02 to 1.2 atoms per 1000 molecules of water, the concentration thereof being related to the thickness of the coolant annuli in conformity with the function defined graphically in Figure 5.

2. A neutronic reactor of the type comprising a matrix of graphite having passages therethrough, bodies of uranium of lesser cross sectional dimensions than said passages and positioned centrally within the said passages, means for passing water coolant through the annuli surrounding the uranium bodies, the water containing fissionable uranium isotope in a concentration as shown along the abscissa of the graph of Figure 5, the thickness of the annuli being adapted to the concentration of uranium isotope in the coolant in conformity with the graph of Figure 5, whereby the capacity of heat output of the reactor is substantially increased above that of the reactor operated with water coolant free of fissionable uranium isotope in the defined concentrations.

References Cited in the file of this patent

FOREIGN PATENTS

| 114,150 | Australia | May 2, 1940 |
| 861,390 | France | Oct. 28, 1940 |
| 233,011 | Switzerland | Oct. 2, 1944 |

OTHER REFERENCES

Business Week (September 1, 1945), pages 60–63.
Kelly et al.: Phy. Rev. 73, pp. 1135–9 (1948).
A Forum Report, Nuclear Reactor Development. Atomic Industrial Forum, 260 Madison Ave., New York 16, N. Y. (July 1954), O. Townsend and E. Wiggin, page 18.